(12) United States Patent
Ito

(10) Patent No.: US 6,944,124 B2
(45) Date of Patent: Sep. 13, 2005

(54) BYPASS CONTROL SYSTEM BASED UPON NMS CONTROL IN ATM EXCHANGER

(75) Inventor: Hidetaka Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 885 days.

(21) Appl. No.: 09/789,742

(22) Filed: Feb. 22, 2001

(65) Prior Publication Data

US 2001/0017842 A1 Aug. 30, 2001

(30) Foreign Application Priority Data

Feb. 25, 2000 (JP) ........................................ 2000-049902

(51) Int. Cl.$^7$ .............................................. H04L 12/26
(52) U.S. Cl. ..................................... 370/217; 370/395.1
(58) Field of Search ................................. 370/216, 217, 370/218, 225, 228, 242, 244, 249, 395.1

(56) References Cited

U.S. PATENT DOCUMENTS 5,398,236 A * 3/1995 Hemmady et al. .......... 370/218

FOREIGN PATENT DOCUMENTS

| JP | 5-316140 | 11/1993 |
|----|----------|---------|
| JP | 11-27286 | 1/1999 |
| JP | 11-163889 | 6/1999 |
| JP | 11-284632 | 10/1999 |
| JP | 2000-59374 | 2/2000 |

* cited by examiner

*Primary Examiner*—Chi Pham
*Assistant Examiner*—Derrick W. Ferris
(74) *Attorney, Agent, or Firm*—Foley & Lardner LLP

(57) ABSTRACT

When a malfunction of a master connection 100 is detected by an ATM exchanger, etc., a notice thereof is transmitted to an NMS 40. The NMS 40 is at all times kept monitoring the state within the network. When receiving the notice of the malfunction from the ATM exchanger, the NMS 40 operates on respective cell header translators (HT) 1B, 1C, 3B, and 3C that are associated with the master connection 100 that has malfunctioned. And, the NMS 40 changes the set values of the cell header translators according to the notice of the malfunction. As a result, the ATM cell is bypassed to a bypass connection 200.

12 Claims, 3 Drawing Sheets

US 6,944,124 B2

BYPASS CONTROL SYSTEM BASED UPON NMS CONTROL IN ATM EXCHANGER

FIELD OF THE INVENTION

The present invention relates to a bypass-route setting system for PVC connection in an ATM network.

BACKGROUND OF THE INVENTION

With the diversification of services and increases in speed and capacity of ATM networks in recent years, it has become necessary to enhance the performance, functionality, and reliability of the ATM exchange system. In many services that ATM networks provides, PVCs (Permanent Virtual Channels) with the party and band semi-fixed are widely used. Under such circumstances, there has been an increasing demand for enhancement of the reliability of the PVC connections.

In order to avoid the breakage of a PVC connection due to a malfunction of the section lines or apparatus, it is considered effective to have a redundancy construction (duplexing, (n+1)-multiplexing) of the section lines in terms of the hardware. This construction, however, becomes complex to maintain and, therefore, the enhancement of the maintainability is lost. As a result, to enhance reliability and maintainability, it is necessary to take measures based on the use of software processing.

Special importance is placed upon how, at the time of a malfunction of the lines, communication should continue to be made with the least amount of cell loss in the PVC connection.

With reference to FIG. 4, an explanation will now be given of such a bypass route setting that is performed through a plurality of ATM exchangers. As illustrated, a master connection 100 that is used as an ordinary communication connection is set between an ATM exchanger 10 and an ATM exchanger 30, and, between the ATM exchangers 10, 20, and 30, there are set bypass connections 200.

The ATM exchangers are each equipped with cell header translators (HT) for each of the input/output section lines.

As a system of routing data to a bypass route which uses software processes, there is a system of switching as shown in FIGS. 1, 2, and 3.

FIG. 1 concerns the ATM exchanger 10 that is used in the network illustrated in FIG. 4. And, FIG. 1 is a view illustrating a state that prevails when in the ATM exchanger 10 there have been distributed PVC connections, the identifiers of which are different from the VPI/VCI of the master connection 100. Namely, FIG. 1 is a view illustrating the setting of the PVC connections by the conventional ATM exchanger.

FIG. 2 is a view, corresponding to the conventional technique, illustrating the flow of cells that, at the time of a malfunction, occur with respect to a bypass connection. FIG. 3 is a view illustrating a state that prevails when the flow of cells that has been bypassed is switched back to the original master connection.

As illustrated in FIG. 1, in the ATM exchanger 10 that is in an ordinary state of operation, the cell that has been received by a cell header translator 1A, by the translated header information is being referred to, is switched within the ATM exchanger 10 to an appropriate route. Then, the cell is output to the master connection through a cell header translator 1B. In this case, assume that a malfunction of the master connection is detected and that, in the ATM exchanger, setting is performed of a bypass connection. At that time, in the ATM exchanger, it was needed to newly set a bypass PVC connection, the VPI/VCI value of which is different from that of the master connection that has malfunctioned. In addition, in the operation of switching to a bypass route or switching back in FIGS. 2 and 3, transfer of data cells is done using a VPI/VCI value that is different from that which has been so far used for communication. So, there was the problem that interruption of data flow, etc. occurred.

Especially, in such a case as where the bypass route is constructed via a plurality of ATM exchangers, as one countermeasure, it may be considered effective to set connection information for use on a bypass route with respect to every one of the ATM exchangers on the bypass route beforehand. Or, there may be set beforhand a connection having another PVC number. Even in that case, it is necessary that the fact that the PVC used on the master connection has been changed over to a PVC for bypass owing to the occurrence of a malfunction, be recognized by each ATM exchanger or a user's side terminal. As a consequence, there was the problem that management of the information became complex.

Also, the invention described in Japanese Patent No. 2982784 discloses the following technique with regard to an ATM exchanger management system. The technique is that, in the case where a malfunction has occurred on the transmission path between the ATM exchangers that adjoin with each other via the transmission path in between, the cell is sent out using a spare transmission path or bypass route. By adopting this countermeasure, the technique aims to restore the ATM service quickly.

In this technique, the ATM exchangers that have been connected to one another via a plurality of transmission paths are each set in units of a section line. And, the ATM exchanger management system thereof includes input-side header translators (header-translators incoming) and output-side header translators (header-translators outgoing) each of which has PVC information of its relevant section line. That system further includes a PVC function management portion which, according to a request sent from the NMS, issues a request to set an ordinary PVC, to set a bypass PVC, and to switch to a bypass route. The portion, in addition, saves the ordinary PVC and bypass PVC information that has been thus set.

The PVC function management portion is directed, when performing a switch between an ordinary route and a bypass route, to perform re-setting of the ordinary PVC and bypass PVC according to the saved ordinary PVC information and bypass PVC information.

Namely, in the above-described conventional technique, there is disclosed the method of setting a bypass that is for a transmission path having malfunctioned between two of the ATM exchangers that are connected to one another via a plurality of transmission paths. However, in an ordinary state of operation, there is a case where a malfunction occurs on each of the adjoining ATM exchangers. In this case, the above-described system of setting a bypass itself has the difficulty of being operated. As a result, it is more highly demanded that the quality of and the reliability of the communication at a level of network be guaranteed.

Also, in actuality, in a large-scale communication carrier, in a wide range of area there are disposed a plurality of (three or more) ATM exchangers, each of which is performing its exchange/transfer processes of communication information in the area where it is disposed. However, despite the ability of, at a level of network, using a plurality of communication section routes, in the above-described conventional technique, because setting of a bypass route is limited to the two exchangers, the following problem arises. Namely, regarding the PVC performing communication with use of the two exchangers that have malfunctioned, providing any service becomes impossible.

SUMMARY OF THE INVENTION

An object of the present invention is to provide a bypass-route setting method that, in an ATM exchange management system performing bypass-route setting as described in Japanese Patent No. 2982784, is especially based on the consideration of a malfunction restoration at the level of network.

To attain the above object, the present invention provides a bypass control system based upon NMS control in an ATM exchanger comprising an input-side cell header translator that receives a cell transmitted on via a communication line, translates PVC identification information of the received cell to header translation information used within the ATM exchanger, and outputs the header translation information to a switch portion in a succeeding stage; and N cell header translators that perform mutual translation between the header translation information and the PVC identification information used with respect to output lines to output the resulting information, where, among the N cell header translators, one cell header translator is used as a first cell header translator with respect to a master connection and a part of or all of the remaining cell header translators are used for setting a bypass connection, comprising means that sets bypass information with respect to the cell header translator used for bypass connection beforehand and that, according to a request to set a bypass route from the network management system, stores in the first cell header translator the information of the cell header translator that is used with regard to the master connection; and means that, when a request to switch to the bypass route is received from the network management system, initializes the first cell header translator to reset the set information of the master connection and that performs loop-back, to the output of the second cell header translator, of an output cell with respect to the master connection that has been received by the first cell header and has been transferred from the input-side cell header.

DETAILED DESCRIPTION OF THE PREFERRED EMBODIMENTS

A bypass control system based upon NMS (Network Management System) control in an ATM exchanger according to the present invention is based on the use of a Pre-Cut/Reroute technique. This technique is to set a bypass route in terms of the software beforehand and to perform switching at the time of a section-line malfunction or section-line trouble. The term "Pre-Cut" means a bypass connection that is set beforehand with respect to a master connection.

In addition, regarding PVC identification information that is used outside the ATM exchanger, i.e. by a network manager or a user, the same identification information can be used as is between the master connection and the bypass connection. Therefore, the bypass control system of the present invention has the feature of the connections becoming easy to manage.

Next, an embodiment of the bypass control system of the present invention will be explained with reference to the drawings.

Figure 4:
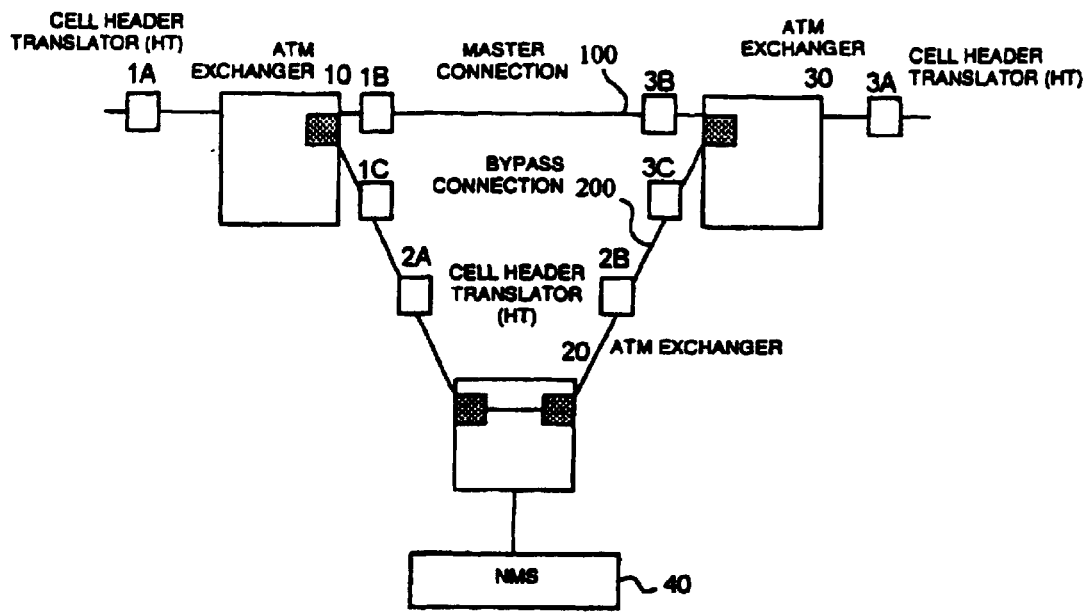
FIG. 4 is a network construction view illustrating bypassing that is performed based upon NMS control in an ATM exchanger according to an embodiment of the present invention.
Figure 5:
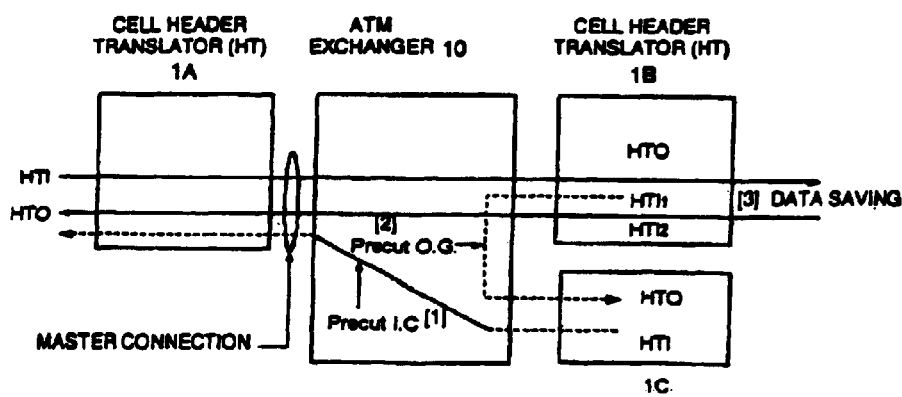
FIG. 5 is a view illustrating setting of a bypass connection by the ATM exchanger according to the embodiment of the present invention.

FIG. 4 is a network construction view illustrating bypassing that is performed under the NMS control made with respect to the ATM exchanger according to the embodiment of the present invention.

FIG. 4 illustrates a network that follows. A master connection 100 is a PVC connection between a cell header translator (HT) 1B belonging to an ATM exchanger 10, and a cell header translator (HT) 3B belonging to the ATM exchanger 30. This master connection 100 is set so that bi-directional communication may be possible therethrough. A malfunction or a trouble on a section-line might occur on the master-connection section between the cell header translators (HT) 1B and 3B. For the countermeasure against such possible malfunction, PVC connections are set to cell header translators 1C, 2A, 2B, and 3C as the bypass connections 200 with respect to the above-described master connection, which are spare ATM section lines.

The cell header translators and the ATM exchanger have translation tables for header information called "HTI (Header Translator In-coming)" and "HTO (Header Translator Out-going)", which are used for changing the cell headers. While referring to this information, they translate VPI/VCI identification information of the ATM cells to identification information that is handled on a hardware basis within a relevant ATM exchanger.

The HTI represents identification information that has been translated from the VPI/VCI information of the cell coming into the ATM translator to an identifier used within the ATM exchanger. On the other hand, the HTO, conversely to the HTI, represents information that, because of being output to outside the ATM exchanger, has been further translated from the above-translated identifier to an output-side VPI/VCI.

The embodiment of the present invention will now be explained regarding a case where in the network construction of FIG. 4, a malfunction or a trouble has occurred on the master connection 100 that is a presently-used data transmission path connecting the ATM exchanger 10 and the ATM exchanger 30.

First, the outline of the operation of the present invention will briefly be stated below. When a malfunction of the master connection 100 is detected by the ATM exchanger, etc., a notice there of is transmitted to the NMS 40. The NMS 40 is at all times kept monitoring the state within the network. When receiving the notice of the malfunction from the ATM exchanger, etc., the NMS 40 operates on the respective cell header translators (HT) 1B, 1C, 3B, and 3C that are associated with the master connection 100 that has malfunctioned. And, the NMS 40 changes the set values of the cell header translators according to the notice of the malfunction. As a result of this, it is possible to bypass the ATM cell to the bypass connection 200.

In the present invention, regarding the ATM cell that was being transmitted via the master connection 100 until before the occurrence of the malfunction, by changing the set values of the cell header translators, that ATM cell is transmitted via the bypass connection. Thereby, even when a malfunction has occurred on the master connection 200, data transmission to the bypass route can be performed using the same PVC information. Therefore, it is possible to prevent the communication from being interrupted.

Next, the detailed operational sequence of detecting a malfunction of the master connection by the NMS 40 of the present invention and correspondingly switching the master connection to the Pre-Cut will be explained using the relevant drawing. It is to be noted that in the following description the set values of the header translators of the ATM exchanger in the network which are set with respect thereto from the NMS 40 are set through various kinds of commands such as Establish Precut Action command. It is also to be noted that hereinafter the I.C is an abridgment of "In-coming" and that the O.G is an abridgment of "Out-going".

(1) Bypass Route Information Setting Operation:

Information that is used with respect to a bypass route is set in the header translator on the bypass route connection beforehand. Here, the header translator provided with respect to each section line has translation information on a plurality of PVCs that it accommodates within itself. However, this information includes not only one that is on a PVC in an actually operated state but also one that is on a PVC corresponding to a bypass connection that has been set as being used for a particular connection.

The NMS 40 transmits a bypass route setting request (Establish Precut I.C Action). Thereby, with regard to the master connection 100, the NMS 40 sets the HTI information of the ATM section-line 1C. Regarding the HTO information of the ATM section-line 1A, the HTO information of the master connection 100 is used as is. Also, regarding the cell header translators, respectively of the ATM exchangers 20 and 30 as well, the HTI and HTO values are set beforehand.

Next, according to the bypass route setting request (Establish Precut O.G Action) from the NMS 40, there is set only the HTO information of the ATM section-line 1C. Regarding the HTI1 side of the master-connection information of the ATM section-line 1B, the software saves the HTI1 information as Precut O.G information.

Figure 1:
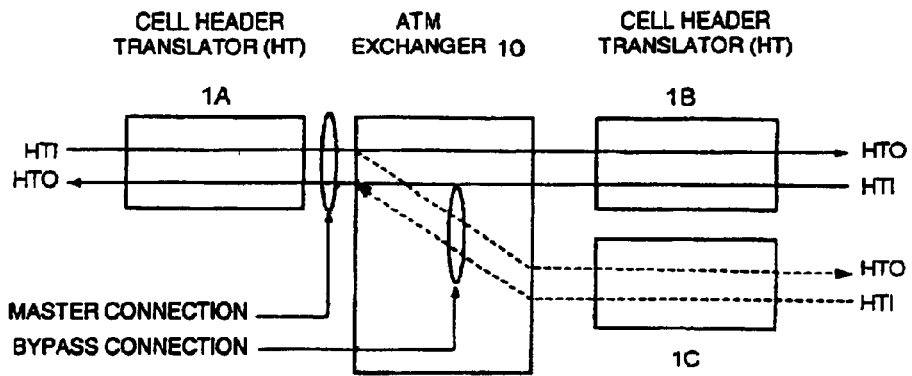
FIG. 1 is a view illustrating setting of PVC connection by a conventional ATM exchanger.
Figure 2:
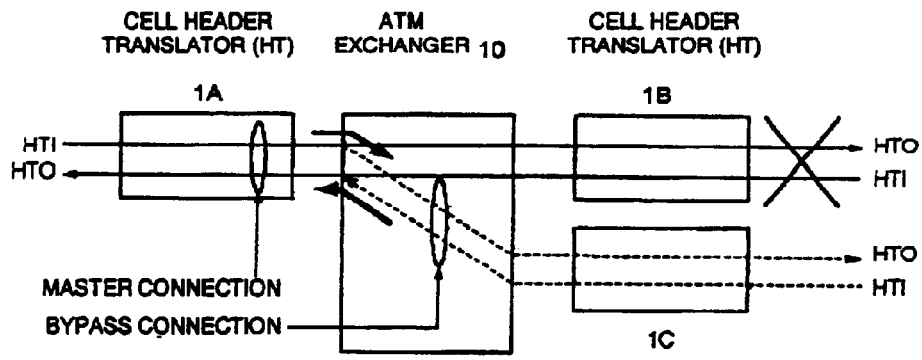
FIG. 2 is a view illustrating switching a bypass route by the conventional ATM exchanger.
Figure 3:
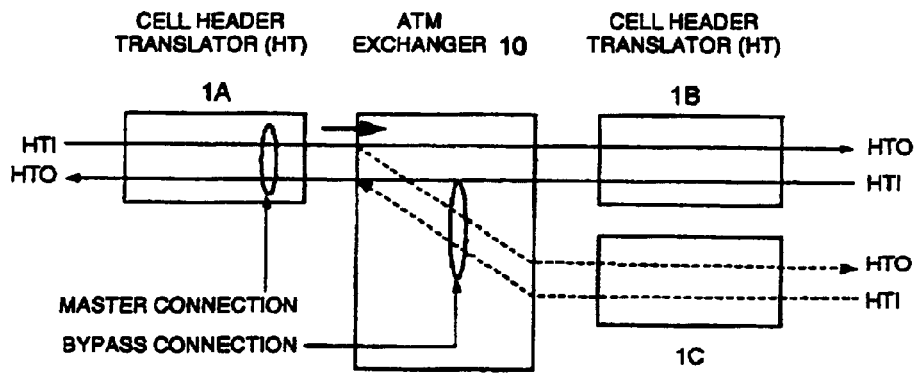
FIG. 3 is a view illustrating switching-back from a bypass route by the conventional ATM exchanger.

When setting the above-described Pre-Cut, the connection information VPI/VCI that is used with regard to the master connection is used as is with regard to the bypass route connections. Namely, in case the Pre-Cut is not used, as in FIG. 1, the PVC connection the VPI/VCI of that is different from that of the master connection must be distributed again as the bypass connection. Conversely, when using the Pre-Cut, the PVC connections the VPI/VCI of that are the same can be distributed.

In this way, with use of the above-described commands, regarding the bypass route, there are set beforehand the HTI and the HTO information with respect to the header translator 1C. Also, in addition, for the information of the cell header translators of the routes constituting the bypass route connections, there are set the HTI and the HTO information.

Figure 6:
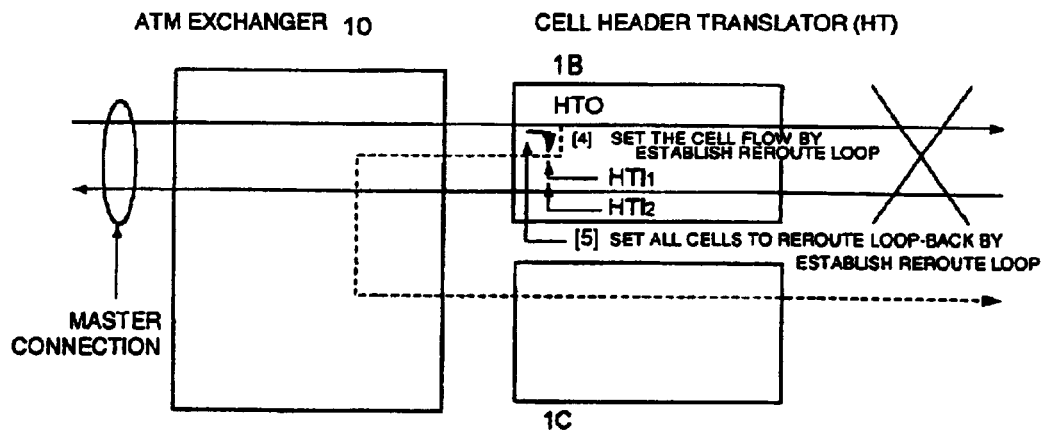
FIG. 6 is a view, corresponding to FIG. 5, illustrating a state that prevails when there has been set a connection for connecting to a bypass connection.
Figure 7:
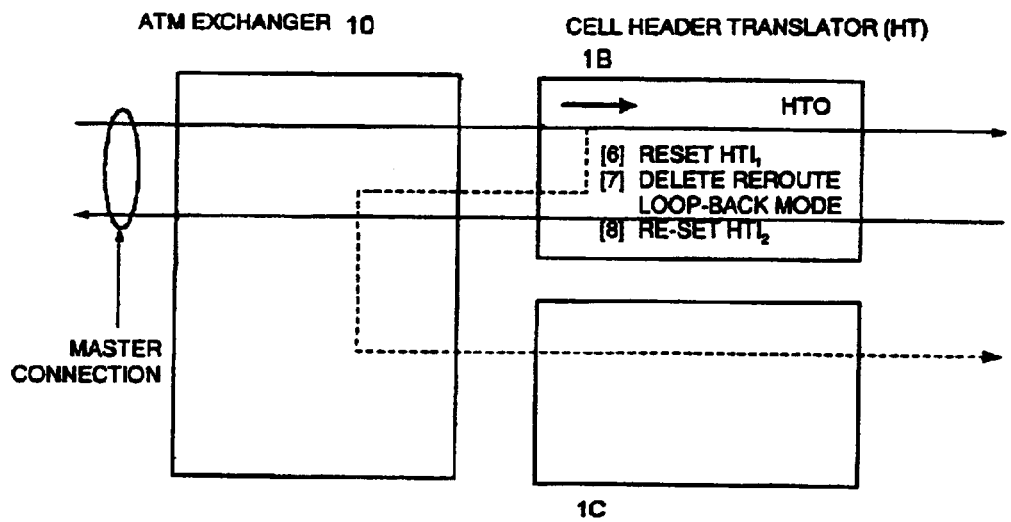
FIG. 7 is a view, corresponding to FIG. 5, illustrating the flow of a cell that, at the time of a malfunction, occurs with respect to the bypass connection.

(2) Operation at the Time of Malfunction Detection:

Next, the actual bypass route setting operation that is performed when a malfunction of the master connection has been notified will be explained with reference to FIGS. 6 and 7.

Also, as the method of performing the above-described actual bypass route setting operation, there are two kinds. One is to start it manually from the operator, etc. and to perform the bypass route setting, while the other is to detect the malfunction within the network and to perform it automatically. Namely, in the former case of performing through the intermediary of the operator, he operates a command to perform a loop-back request (Establish Route Loop Back Action) to the cell header translator 1B of the ATM exchanger 10 from the NMS 40.

As a result, in the ATM exchanger 10, the cell that was so that far kept flowing into the master connection 100 is reroute-looped back to the cell header translator 1C without flowing out thereinto. In this way, the PVC connection is switched through the software process from the master connection to the bypass PVC connection that has been set through the use of the Reroute Loop Back command.

In the latter case of the automatic detection, upon the occurrence of a malfunction on the section line, the NMS 40 detects this malfunction. Then, the NMS 40 issues to the ATM switch 10 a command instruction to request the performance of the loop-back operation (Establish Reroute Loop Back Action). Resultantly, in the ATM exchanger 10, the software switches the PVC connection according to the Reroute Loop Back instruction. The sequence is summarily as follows.

(a) Initialize the HTI2 of the ATM section-line 1B from NMS through the Establish Reroute Loop Back command, for a resetting the same.

(b) Set the path (the HTI1 of the ATM section-line) kept to have theretofore been saved with a set phase. And, (c) set the ATM section-line 1B to all-cell reroute-loop-back mode.

Namely, by performing initialization and reroute-loop-back mode setting with respect to the ATM exchanger 1B the cell of that was so that far being output to the master connection as stated above, setting to the bypass route is performed.

For the above-described reasons, in the ATM exchanger 10, the instruction to perform switching of PVC connections is given only with respect to the ATM section-line device 1B through the process of the software. With respect to the ATM section-line devices 1A, 1C, there is no need to perform any control at the time of malfunction detection. Accordingly, the process becomes simple to perform. Accordingly, it is also possible to operate an application for maintaining the malfunction section-line, etc. by using a processing ability that has been resultantly saved.

(3) Bypass Route Switch-back Operation:

Next, the sequence of releasing the setting of the bypass route will be explained with reference to FIG. 7. In this case, also, there are two kinds of method for executing the release. One is to start manually from the operator, while the other is to detect the restoration of the malfunction and release the setting, through the system operation on a basis of self-control.

In the former case of releasing through the intermediary of the operator, the operator operates a command to perform a loop-back delete request (Action for delete Reroute Loop Back) from the NMS 40. Thereby, the exchange 10 releases the Loop with respect to that the software was so that far kept set.

In the latter case of on a basis of self-control, due to restoration of the malfunction of the section line, when the NMS 40 receives a message to that effect, the NMS 40 issues a command to delete the loop-back request to the switch. As a result, the ATM exchanger 10 releases the loop-back setting (Loop) through the software process. The sequence is summarily as follows.

(a) Initialize the ATM section-line 1B to reset the HTI1 information.

(b) Delete the reroute loop-backmode kept set with respect to the cell header translator 1B. And, (c) re-set the master connection HTI2 with respect to the ATM section-line device 1B.

Other Embodiments of the Invention

Other embodiments of the present invention will hereafter be explained with reference to FIG. 4.

Referring to FIG. 4, in the case a malfunction occurs on the mater connection, the ATM cell is bypassed to the bypass connection. The ATM exchanger 20 is used as a relay exchanger. To this exchanger 20, a connection is distributed beforehand. By designating that connection, the ATM cell is caused to flow with respect to the ATM exchanger 30. In this example, the relay exchanger is used one in number by way of example. However, the relay exchanger may be used two or more in number. Also, the bypass connection may be distributed directly to the exchanger 30 without using any relay exchanger 20.

Namely, the section from a first ATM exchanger to a second one is used as one for the master connection. And, thereby, a plurality of ATM exchangers are connected to one another in the shape of a mesh. In such a wide-band network as this, it is possible to set a plurality of bypass routes. Namely, even when setting, for example, a first, a second, and a third bypass connections, the connection management tables for managing the whole connections are not increased in number. In addition, regarding the switching operation to a respective one of the bypass connections, it is sufficient to give a switching instruction only to the ATM exchangers located at the ends of the master connection. Namely, the control becomes very much simplified. In such an embodiment, for the purpose of selecting a respective one of that plurality of bypass connections, it is also possible to adopt other construction that follows. Namely, it can be arranged to select one bypass connection from among of them, considering the number of the ATM-exchangers (HOP's number), transmission sections, traffic capacities, and other parameters constituting the bypass connections.

The present invention has at least the following three advantages.

(1) Even in the case a number of PVC connections are set between the two ATM exchangers, switch and switch-back of the PVC connection have only to be performed by control made with respect to a single ATM exchanger. Accordingly, the control is simplified.

(2) Since using the same VPI/VCI information for setting the bypass route, the user does not need to keep having a feel of a malfunction even if having occurred. And, (3) at the time of the occurrence/restoration of the section-line malfunction or trouble, the user does not need to re-set the PVC connections.

As described above, the reliability on PVC connection that the ATM exchanger provides can be enhanced on account of such functions performed by the software program. Furthermore, because the individual commands become lessened at the time of the trouble, the bypass route setting process also gets expedited.

I claim:

1. In a communication network including a plurality of ATM exchangers that are connected to one another via communication lines and a network management system for monitoring the ATM exchangers, where the ATM exchanger comprises:

an input-side cell header translator that receives a cell transmitted via a communication line, translates PVC identification information of the received cell to header translation information used within the ATM exchanger, and outputs the header translation information to a switch portion in a succeeding stage;

a first cell header translator that performs mutual translation between the header translation information and the PVC identification information used with respect to a master connection to output the resulting information; and a second cell header translator that performs mutual translation between the header translation information and the PVC identification information used with respect to a bypass connection to output the resulting information, a bypass control system based upon NMS control in an ATM exchanger comprising:

means that, according to a request to set a bypass route from the network management system, sets a bypass connection value with respect to the second cell header translator beforehand and that has separately stored therein the information of the master connection that is used in the first cell header translator; and means that, when a request to switch to the bypass route is received from the network management system, initializes the first cell header translator to reset the set information of the master connection presently used and that performs loop-back, to the output of the second cell header translator, of an output cell used with respect to the master connection that has been received by the first cell header translator and has been transferred from the input-side cell header translator;

wherein the bypass route is constructed by way of at least one ATM exchanger that is not directly connected to the master connection.

2. A bypass control system based upon NMS control in an ATM exchanger according to claim 1, wherein the request to switch to the bypass route from the network management system is made by an operator.

3. A bypass control system based upon NMS control in an ATM exchanger according to claim 1, wherein the request to switch to the bypass route from the network management system is automatically made according to a notice of a malfunction that has been received from the ATM exchanger in the network management system.

4. A bypass control system based upon NMS control in an ATM exchanger according to claim 1, wherein, in the case the bypass route is selected, one bypass route is selected considering the number of the ATM exchangers (HOP's number), transmission sections, and traffic capacity of the bypass route.

5. In an ATM exchanger including:

an input-side cell header translator that is connected to a plurality of other ATM exchangers connected to one another via communication lines, receives a cell transmitted via a communication line, translates PVC identification information of the received cell to header translation information used within the ATM exchanger, and outputs the header translation information to a switch portion in a succeeding stage; and N cell header translators that perform mutual translation between the header translation information and the PVC identification information used with respect to output lines to output the resulting information, where, among the N cell header translators, one cell header translator is used as a first cell header translator with respect to a master connection and a part of or all of the remaining cell header translators are used for setting a bypass connection, a bypass control system based upon NMS control in an ATM exchanger comprising:

means that sets bypass information with respect to a cell header translator used as a cell header translator for use on the bypass connection beforehand and that, according to a request to set a bypass route from the network management system, stores in the first cell header translator the information of the cell header translator that is used with regard to the master connection; and means that, when a request to switch to the bypass route is received from the network management system, initializes the first cell header translator to reset the set information of the master connection and that performs loop-back, to the output of the cell header translator for use on the bypass connection, of an output cell with respect to the master connection that has been received by the first cell header translator and has been transferred from the input-side cell header translator;

wherein the bypass route is constructed by way of at least one ATM exchanger that is not directly connected to the master connection.

6. A bypass control system based upon NMS control in an ATM exchanger according to claim 5, wherein, in the case the bypass route is selected, one bypass route is selected considering the number of the ATM exchangers (HOP's number), transmission sections, and traffic capacity of the bypass route.

7. A bypass control system based upon NMS control in an ATM exchanger according to claim 5, wherein the request to switch to the bypass route from the network management system is made by an operator.

8. A bypass control system based upon NMS control in an ATM exchanger according to claim 5, wherein the request to switch to the bypass route from the network management system is automatically made according to a notice of a malfunction that has been received from the ATM exchanger in the network management system.

9. In an ATM exchanger including:

an input-side cell header translator that is connected to a plurality of other ATM exchangers connected to one another via communication lines, receives a cell transmitted via a communication line, translates PVC identification information of the received cell to header translation incoming used within the ATM exchanger, and outputs the header translation incoming to a switch portion in a succeeding stage; and N cell header translators that perform mutual translation between the header translation incoming and the PVC information used with respect to output lines to output the resulting information, where, among the N cell header translators, one cell header translator is used as a first cell header translator with respect to a master connection and a part of or all of the remaining cell header translators are used for setting a bypass connection, a bypass control system based upon NMS control in an ATM exchanger comprising:

means that sets bypass information with respect to a cell header translator used as a cell header translator for use on the bypass connection beforehand and that, according to a request to set a bypass route from the network management system, stores in the first cell header translator first cell header incoming information of the first cell header translator that is used with regard to the master connection and second cell header incoming information that is to be output to the cell header translator for use on the bypass connection; and means that, when a request to switch to the bypass route is received from the network management system, initializes the first cell header translator to reset the first cell header incoming information including set information of the master connection and that reads out the second cell header incoming information previously stored in the first cell header translator and thereby performs loop-back, to the output of the cell header translator for use on the bypass connection, of an output cell with respect to the master connection that has been transferred from the input-side cell header translator;

wherein the bypass route is constructed by way of at least one ATM exchanger that is not directly connected to the master connection.

10. A bypass control system based upon NMS control in an ATM exchanger according to claim 9, wherein, in the case the bypass route is selected, one bypass route is selected considering the number of the ATM exchangers (HOP's number), transmission sections, and traffic capacity of the bypass route.

11. In a communication network including a plurality of ATM exchangers that are connected to one another via communication lines and a network management system for monitoring the ATM exchangers, where the ATM exchanger comprises:

an input-side cell header translator that receives a cell transmitted via a communication line, translates PVC identification information of the received cell to header translation information used within the ATM exchanger, and outputs the header translation information to a switch portion in a succeeding stage;

a first cell header translator that performs mutual translation between the header translation information and the PVC identification information used with respect to a master connection to output the resulting information; and a second cell header translator that performs mutual translation between the header translation information and the PVC identification information used with respect to a bypass connection to output the resulting information, a bypass control system based upon NMS control in an ATM exchanger comprising:

means that, according to a request to set a bypass route from the network management system, sets a bypass connection value with respect to the second cell header translator beforehand and that has separately stored therein the information of the master connection that is used in the first cell header translator; and means that, when a request to switch to the bypass route is received from the network management system, initializes the first cell header translator to reset the set information of the master connection presently used and that performs loop-back, to the output of the second cell header translator, of an output cell used with respect to the master connection that has been received by the first cell header translator and has been transferred from the input-side cell header translator;

wherein the bypass route is constructed by way of at least one ATM exchanger that is not directly connected to the master connection; and wherein the bypass route is selected from among a plurality of possible bypass routes by considering the number of ATM exchangers on each of the possible bypass routes.

12. A communication network comprising:

a plurality of ATM exchangers;

communication lines connected to each of said plurality of ATM exchangers;

a network management system for monitoring the ATM exchangers; and a bypass control system based on NMS control;

wherein:

each of the ATM exchanger comprises:

an input-side cell header translator that receives a cell transmitted via a communication line, translates PVC identification information of the received cell to header translation information used within the ATM exchanger, and outputs the header translation information to a switch portion in a succeeding stage;

a first cell header translator that performs mutual translation between the header translation information and the PVC identification information used with respect to a master connection to output the resulting information; and a second cell header translator that performs mutual translation between the header translation information and the PVC identification information used with respect to a bypass connection to output the resulting information; and wherein:

said bypass control system comprises:

means that, according to a request to set a bypass route from the network management system, sets a bypass connection value with respect to the second cell header translator beforehand and that has separately stored therein the information of the master connection that is used in the first cell header translator; and means that, when a request to switch to the bypass route is received from the network management system, initializes the first cell header translator to reset the set information of the master connection presently used and that performs loop-back, to the output of the second cell header translator, of an output cell used with respect to the master connection that has been received by the first cell header translator and has been transferred from the input-side cell header translator;

wherein the bypass route is constructed by way of at least one ATM exchanger that is not directly connected to the master connection.

* * * * *